United States Patent Office 3,605,200
Patented Sept. 20, 1971

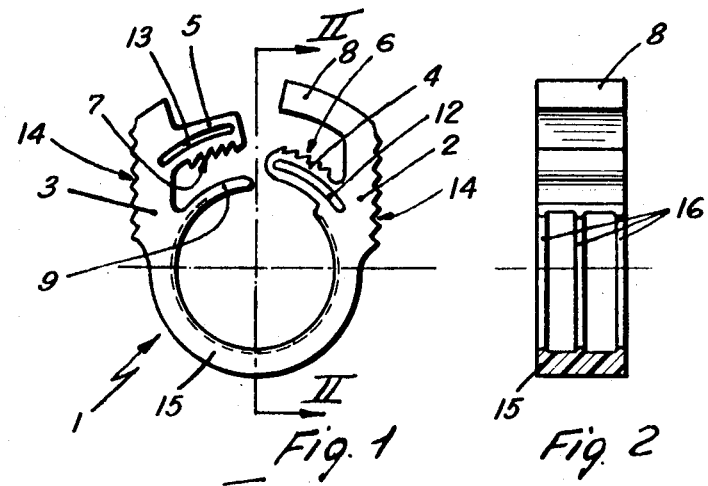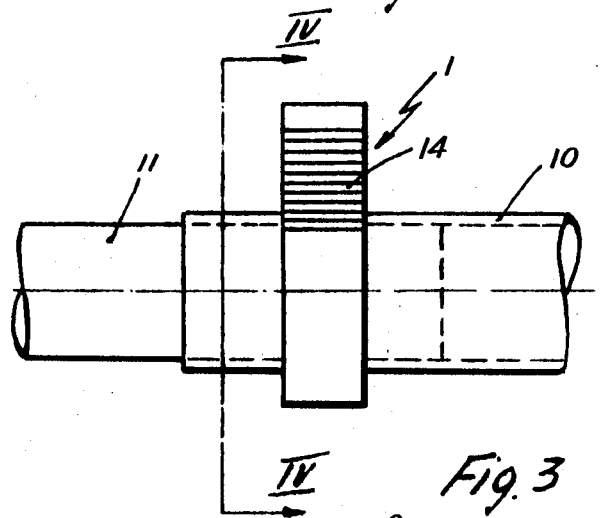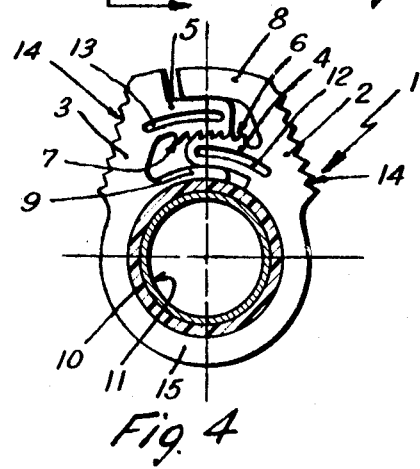

3,605,200
CLAMP FOR FASTENING TUBULAR ELEMENTS
Michele Vallinotto, Strada San Michele 29, Testona, Moncalieri, Italy, and Luigi Villata, Viale Stazione 6, Moncalieri, Italy
Filed Nov. 21, 1969, Ser. No. 878,929
Claims priority, application Italy, Nov. 23, 1968, 20,059/68
Int. Cl. B65d 63/02
U.S. Cl. 24—20TT
4 Claims

ABSTRACT OF THE DISCLOSURE

A single-piece resilient clamp for fastening a sleeve or collar on a tubular pipe and shaped like a U. Each branch of the clamp has an inwardly projecting, center-slotted, toothed extension, as well as an inwardly projecting non-toothed extension. The outer surface of each branch is corrugated so as to enable a compression tool safely to cause the engagement of the toothed extensions with each other. Circumferential knurling on the clamp's inner surface ensures the positive fastening thereof on the elements to be tightened.

THE FIELD OF INVENTION

The present invention relates to a clamp for fixedly connecting tubular elements superimposed to one another and, more particularly, it relates to a clamp suitable for fastening flexible or resilient union sleeves or collars or couplings surrounding an inner tubular member.

THE PRIOR ART

Single-piece fastening means of the clamp type are already well known and are generally employed in fastening superimposed tubular elements without need of auxiliary fastening means, such as bolts, cotter pins, rivets or the like.

However, although representing already a technical advance in the art, these known one-piece clamps have the disadvantage of not permitting the graduated application of pressure during fastening, thus becoming inflexible as to the different needs of industry.

SUMMARY OF THE INVENTION

It is the main object of the present invention to provide a clamp-type fastener so shaped and constructed as to be applicable in all variations of requirements and to be adaptable to any degree of pressure desired.

To this purpose, the device of the invention is a one-piece clamp-type fastener, constructed of resilient material and substantially U-shaped.

Each branch of the U-shaped clamp is provided with a first, arcuated, inwardly projecting extension, one extension being positioned above the other. Both extensions are provided with teeth in such a manner that the teeth of one extension are inclined in a direction opposed to that of the teeth of the other extension, so that perfect engagement therebetween may be rendered possible.

Furthermore, each branch of the clamp is provided with a second, arcuated, inwardly projecting extension, said extension being toothless and orbitally offset with respect to the toothed extensions, so as to form an inlet or bay within which the opposed toothed extension may be inserted during clamping operation.

The first mentioned, toothed extension are conveniently provided with a slotted region therein so as to permit even greater resilience or elasticity and facilitate the deformation of the extension during clamping engagement.

Furthermore, the inner surface of the clamp is provided with knurling or small corrugations or equivalent uneven surfacing, so that a better grip and engagement of the clamp upon the tubular element contacting it may be achieved.

Finally, the outer surfaces of the branches of the U-shaped clamp are provided with a plurality of parallel cuts or corrugations, parallel preferably to the longitudinal axis of the tubular element to be fastened. The purpose of this feature is to ensure a safe and convenient grip of the compression tool on the branches of the clamp.

BRIEF DESCRIPTION OF THE DRAWINGS

The present invention will become more clearly apparent by referring to the accompanying drawings which are presented for illustration purpose only without limiting the scope of the invention.

FIG. 1 is a frontal elevational view of the clamp of the invention;

FIG. 2 is a sectional view of the clamp of FIG. 1 taken along lines II—II thereof;

FIG. 3 is a side elevational view of the device of the invention applied to a sleeve-surrounded tubular element; and FIG. 4 is a sectional view along lines IV—IV of FIG. 3 showing the device of the invention in application.

DETAILED DESCRIPTION OF THE INVENTION

Referring now to the accompanying drawings, the clamp of the invention is formed of a single element or component 1, prepared from material which is resilient, such as a suitable plastic material, and substantially U-shaped.

As clearly shown in FIGS. 1 and 4, the branches 2 and 3 of the clamp are provided each with a first extension, indicated at 4 and 5, respectively. Extensions 4 and 5 are arcuated and inwardly directed. Extension 5 of branch 3 is positioned higher than extension 4 of branch 2.

Extensions 4 and 5 are provided each with a plurality of teeth, saw-like, 6 and 7. Teeth 6 and 7 are inclined opposite to each other, so that the teeth of the extension 4 of branch 2 may engage firmly the teeth of the extension 5 of branch 3.

Furthermore, each branch 2 and 3 of the clamp is provided with a second extension, indicated respectively at 8 and 9. Extensions 8 and 9 are also arcuated and inwardly directed, but do not have teeth. Extension 8 of branch 2 is positioned in such a way as to form with extension 4 an inlet or bay therebetween, so that the opposite extension 5 of branch 3 may be readily inserted therein. Extension 9 of branch 3, similarly, is positioned in such a way and with respect to extension 5 of branch 3, as to form an inlet or bay for the ready insertion therein of the toothed extension 4 of branch 2.

It can be readily seen in FIG. 4 how the toothed extensions fit into the opposing inlets or bays when the clamp is employed in fastening the sleeve 10 around tubular element 11, the fastening action being possible on a graduated and variable degree, depending on the number of teeth provided on the extensions 4 and 5.

Extensions 4 and 5 are also provided with slots 12 and 13, respectively, the purpose of the slots being the application of a greater degree of resilient deformation of the extensions, so as to facilitate the engagement of the teeth.

Branches 2 and 3 of the U-shaped device are provided on their outer surfaces with a plurality of cuts or corrugations 14, parallel to the longitudinal axis of the tubular element to be fastened. Purpose of members 14 is to facilitate the grip on the clamp by the compression tool employed, for example a pair of pliers. The inner surface 15 of the U-shaped clamp, contacting the sleeve 10 is also provided with suitable corrugations or knurling 16, so as to ensure a gripping effect of the clamp and to prevent slippage.

The operation of the device of the invention is, in conclusion, extremely simple and practical. It merely requires slipping the clamp over the sleeve 10, inserting the tubular element 11 within the sleeve 10, and compressing with a suitable tool and to the desired limit the clamp 1, by applying the force on the two branches 2 and 3 of the clamp, see FIG. 4. To remove the clamp, it is sufficient to apply a force on the two branches 2 and 3 in a direction opposite to each other but parallel to the longitudinal axis of the sleeve and tubular element. The resiliency of the clamp permits the toothed extensions to disengage from each other.

What we claim is:

1. Clamp for fastening tubular elements comprising a U-shaped body, resilient and having a first and a second branch; an arcuated toothless, inwardly projecting extension in the lower part of said first branch; an arcuated, inwardly projecting extension in the upper part of said first branch and having a plurality of downwardly projecting teeth; an arcuated, toothless, inwardly projecting extension in the upper part of said second branch; an arcuated, inwardly projecting extension in the lower part of said second branch and having a plurality of upwardly projecting teeth; the teeth of the extensions of said first and said second branch being inclined so as to firmly engage one another when compressive forces are applied upon said first and said second branch toward each other.

2. The clamp, according to claim 1, wherein the extensions of said first and said second branch having teeth therein are provided with arcuated slots therein.

3. The clamp, according to claim 1, wherein said U-shaped body is provided with circumferential knurling on the inner surface thereof.

4. The clamp, according to claim 1, wherein said first and said second branch are provided with corrugations on the outer surface thereof and parallel to the longitudinal axis of the tubular member to be fastened.

References Cited
UNITED STATES PATENTS

| | | | |
|---|---|---|---|
| 712,765 | 11/1902 | Cole | 24—20R |
| 1,441,154 | 1/1923 | Johnson | 24—20TT |

DONALD A. GRIFFIN, Primary Examiner